United States Patent
Sanada et al.

(10) Patent No.: US 6,355,187 B1
(45) Date of Patent: *Mar. 12, 2002

(54) CONDUCTIVE PASTE AND GLASS CIRCUIT SUBSTRATE

(75) Inventors: Tomoki Sanada, Shiga-ken; Haruhiko Kano, Muko; Fumiya Adachi, Shiga-ken, all of (JP)

(73) Assignee: Murata Manufacturing Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/363,298

(22) Filed: Jul. 28, 1999

(30) Foreign Application Priority Data

Jul. 28, 1998 (JP) .............................. 10-228603

(51) Int. Cl.$^7$ ................................. H01B 1/08
(52) U.S. Cl. ................. 252/518.1; 252/521.2; 252/513; 252/514; 252/520.3; 428/432; 501/26; 501/16; 501/19; 501/20; 501/21; 174/411; 174/414
(58) Field of Search ................. 252/514, 513, 252/519.12, 519.3, 519.5, 521.2, 519.13, 520.3, 518.1; 428/432; 501/26, 16, 19–21; 174/414, 411

(56) References Cited

U.S. PATENT DOCUMENTS

| | | | |
|---|---|---|---|
| 4,316,942 A | * 2/1982 | Kuo | .............. 428/432 |
| 4,419,279 A | * 12/1983 | Abrams | .............. 252/514 |
| 4,623,389 A | 11/1986 | Donley et al. | .............. 106/1.14 |
| 4,650,923 A | * 3/1987 | Nishigaki et al. | .......... 174/68.5 |
| 5,346,651 A | 9/1994 | Oprosky et al. | |
| 5,378,408 A | 1/1995 | Carroll et al. | |
| 5,439,852 A | * 8/1995 | Hormadaly | .................. 501/26 |

OTHER PUBLICATIONS

Patent Abstracts of Japan, vol. 1998, No. 09, Jul. 31, 1998 & JP 10 106346 A (Tanaka Kikinzoku Kogyo KK), Apr. 24, 1998, Abstract.

Patent Abstracts of Japan, vol. 1997, No. 05, May 30, 1997 & JP 09 017232 A (Tanaka Kikinzoku International KK), Jan. 17, 1997, Abstract.

Patent Abstracts of Japan, vol. 1995, No. 05, Jun. 30, 1995 & JP 07 037420 A (TDK Corp.) Feb. 7, 1995, Abstract.

* cited by examiner

Primary Examiner—Yogendra N. Gupta
Assistant Examiner—Derrick G. Hamlin
(74) Attorney, Agent, or Firm—Ostrolenk, Faber, Gerb & Soffen, LLP

(57) ABSTRACT

There is provided a conductive paste comprising a conductive component, a glass frit, and a vehicle, wherein the glass frit comprises a glass and at least one of alumina ($Al_2O_3$), silica ($SiO_2$), titania ($TiO_2$) and zirconia ($ZrO_2$). The conductive paste is capable of being baked at a low temperature with sufficient coloring, and is suitable for forming a circuit on a glass substrate, the glass circuit substrate suitable for application in a defogging glass for an automobile window formed therewith.

19 Claims, 6 Drawing Sheets

CONDUCTIVE PASTE AND GLASS CIRCUIT SUBSTRATE

BACKGROUND OF THE INVENTION

1. Field of the Invention

The present invention relates to a conductive paste capable of being baked at a low temperature and suitable, for example, for the application of forming a circuit on a glass substrate, and a glass circuit substrate suitable for the application as a defogging glass for an automobile window formed therewith.

2. Description of the Related Art

A defogging glass for an automobile window for preventing fogging caused by dew condensation having a circuit (thick film electrode) found on the surface of a glass by applying a conductive paste and generating heat by energizing the circuit (thick film electrode) has been used.

Recently, glass having the rear surface of the thick film electrode circuit colored thickly has been preferred as the defogging glass. Conventionally, the thick coloring has been obtained in the rear surface of the circuit (thick film electrode) by forming the electrode with a conductive paste containing a pigment such as a chromium (Cr) oxide.

However, even in the case of using the above-mentioned conventional conductive paste containing a pigment such as a chromium (Cr) oxide, sufficient coloring cannot always be obtained, and thus a conductive paste having a better coloring property has increasingly been desired.

Moreover, a conductive paste having a pigment such as a chromium (Cr) oxide gives rise to problems of difficulty in sintering and a low bonding strength of the thick film electrode on the glass surface.

As to the bonding strength, a method for promoting sintering by changing the sintering conditions is conceivable, such as raising the temperature at the time of sintering. However, since the glass itself comprising the circuit cannot endure high temperature, there is a limit in the sintering temperature.

SUMMARY OF THE INVENTION

To overcome the above described problems, preferred embodiments of the present invention provide a conductive paste capable of being baked at a low temperature, with sufficient coloring, and suitable for forming a circuit on a glass substrate, and a glass circuit substrate suitable for the application in a defogging glass for an automobile window formed therewith.

One preferred embodiment of the present invention provides a conductive paste comprising a conductive component, a glass frit and a vehicle, wherein: the glass frit comprises a main glass component and at least one member selected from the group consisting of alumina ($Al_2O_3$), silica ($SiO_2$), titania ($TiO_2$) and zirconia ($ZrO_2$).

Since the above described conductive paste uses a glass frit prepared by adding at least one of $Al_2O_3$, $SiO_2$, $TiO_2$ and $ZrO_2$ to a main glass component as the glass frit, color dimness can be prevented by restraining dispersion of Ag into the glass substrate, and thus sufficient coloring can be obtained without adding a pigment. Moreover, since a pigment needs not be added, the baking operation can be conducted at a low temperature efficiently.

In the above described conductive paste, the conductive component may comprise (a) Ag, or (b) Ag and at least one of Cu, Pd and Pt, as the main substance.

Since (a) Ag, or (b) Ag and at least one of Cu, Pd and Pt is used as the main substance comprising the conductive component, a conductive paste capable of forming an electrode having sufficient conductivity for certain can be obtained, and thus it is advantageous.

As the conductive component, a part of a metal component can be contained in a resinate state.

In the above described conductive paste, nickel (Ni) or copper oxide (CuO) may be added for adjusting the resistance. When nickel (Ni) or copper oxide (CuO) is added for adjusting the resistance, a conductive paste having a desired characteristic can be obtained by adjusting the resistance, and thus the present invention can further be effective.

In the above described conductive paste, the glass frit may be prepared by adding at least one of alumina ($Al_2O_3$) powders, silica ($SiO_2$) powders, titania ($TiO_2$) powders and zirconia ($ZrO_2$) powders to at least one Pb-containing glass, Bi-containing glass, Zn-containing glass or Ba-containing glass, and adjusting the average particle size $D_{50}$ in the range from about 0.5 to 2.5 $\mu$m.

Since a glass frit prepared by adding at least one of $Al_2O_3$ powder, $SiO_2$ powder, $TiO_2$ powder or $ZrO_2$ powder to at least one Pb-containing glass, Bi-containing glass, Zn-containing glass or Ba-containing glass, and adjusting the average particle size $D_{50}$ in the range from about 0.5 to 2.5 $\mu$m is used, sufficient coloring can be obtained without adding a pigment more certainly as well as the baking operation can be conducted efficiently at a low temperature.

In the above described conductive paste, powders with an about 40 to 90 $m^2$/g specific surface area may be used for the alumina ($Al_2O_3$) powders, the titania ($TiO_2$) powders and the zirconia ($ZrO_2$) powders, powders with an about 150 to 300 $m^2$/g specific surface area may be used for the silica ($SiO_2$) powders, and at least one of the alumina ($Al_2O_3$) powders, the silica ($SiO_2$) powders, the titania ($TiO_2$) powders or the zirconia ($ZrO_2$) powders may be added so as to have an about 5 to 60% by weight content ratio in the glass frit.

Then powders with an about 40 to 90 $m^2$/g specific surface area are used for the $Al_2O_3$ powders, the $TiO_2$ powders and the $ZrO_2$ powders or powder with an about 150 to 300 $m^2$/g specific surface area are used for the $SiO_2$ powders, and at least one of the $Al_2O_3$ powders, the $SiO_2$ powders, the $TiO_2$ powders and the $ZrO_2$ powders is added so as to have an about 5 to 60% by weight content ratio in the glass frit, sufficient coloring can be obtained without adding a pigment and the baking operation can be conducted efficiently at a low temperature, and thus the present invention can further be effective.

In the above described conductive paste, the glass frit may be contained in about 2.0 to 8.0% by weight ratio. At this weight ratio, a conductive paste having stable characteristics concerning sintering, bonding and coloring can be obtained.

Another preferred embodiment of the present invention provides a glass circuit substrate comprising a circuit on a glass substrate provided with the above described conductive paste.

The above described glass circuit substrate obtained by forming a circuit on a glass substrate with the conductive paste has a good coloring property and excellent bonding strength of an electrode (circuit), and thus a high reliability can be obtained.

The above described glass circuit substrate may serve as a defogging glass for an automobile window.

Since the glass circuit substrate obtained by forming a circuit on a glass substrate with the conductive paste is used as a defogging glass for an automobile window, a defogging glass for an automobile with high quality and high reliability can be provided with sufficient coloring and the excellent bonding property.

Other features and advantages of the present invention will become apparent from the following description of the invention which refers to the accompanying drawings.

DESCRIPTION OF THE PREFERRED EMBODIMENTS

Glass frits were produced by the following procedure.

Glass cullets were obtained by melting glass materials containing Pb, Bi, Zn and Ba at high temperature, followed by quenching for vitrification.

Then, the glass cullets were coarsely pulverized to a 5 to 10 μm average particle size with a roll crusher, a stone crusher, or the like.

Glass frits were obtained by adding fine powders of $Al_2O_3$, $SiO_2$, $TiO_2$ and $ZrO_2$ to the coarsely pulverized glass cullets, and finely pulverized and mixed with a pot mill, a planetary ball mill, or the like.

Conductive pastes were produced by mixing 1 to 10% by weight of the glass frits, 69 to 78% by weight of silver (Ag) powder, 1% by weight of nickel powder, 1% by weight of copper oxide powder, and 19% by weight of an organic vehicle, and kneading and dispersing with a triple roll.

As the organic vehicle, one prepared by dissolving 8% by weight of a cellulose resin in terpineol was used.

The nickel powder and the copper oxide powder were added for adjusting the resistance value.

Production of samples for measuring the bonding strength was done by printing the conductive pastes produced as mentioned above onto the surface of slide glass substrates (soda-lime glass, 260 mm×760 mm×1.4 mm) in a 2 mm square shape, drying at 150° C. for 10 minutes, and baking at a 600° C. for one minute (in-out: 5 minutes) so as to form electrodes.

Then, the slide glass substrates with the electrodes formed were placed on plates heated to 150° C., and lead terminals were soldered on the electrodes.

As the lead terminals, an L-shaped solder copper line having a 0.6 mm diameter was used. A solder containing Sn-Pb-Ag was used as the solder, and a flux prepared by dissolving rosin in isopropyl alcohol was used as the flux.
Production of Samples for Measuring the Coloring Thickness Similar to the case of the samples for measuring the bonding strength, samples for measuring the coloring thickness were produced by printing the conductive pastes onto the surface of slide glass substrates in a 10 mm diameter circle pattern, drying at 150° C. for 10 minutes, and baking at a 600° C. for one minute (in-out: 5 minutes).
Measurement of the Bonding Strength With the samples for measuring the bonding strength produced as mentioned above, the bonding strength of the electrodes with the slide glass substrates was measured. In measuring the bonding strength, a lead line was pulled at a 20 mm/min rate in the perpendicular direction with respect to the surface of the slide glass having the above-mentioned electrode formed thereon. The strength at which the electrode was peeled off is defined to be the bonding strength.

Figures 1A, 1B:
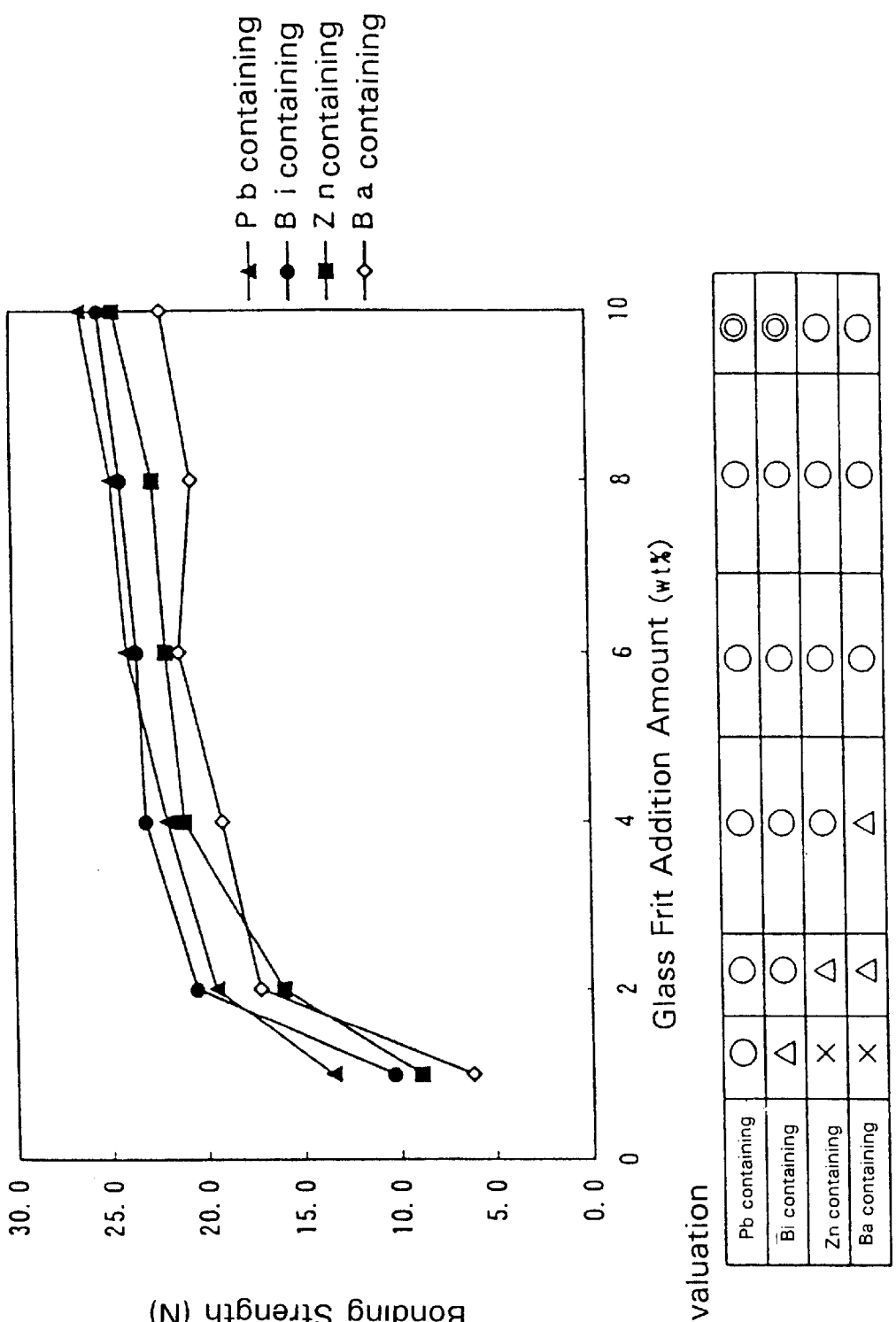
FIG. 1A is a graph showing the relationship between the glass frit addition amount and the bonding strength.
FIG. 1B is a chart showing the relationship between the glass frit addition amount and the coloring evaluation.
Figures 2A, 2B:
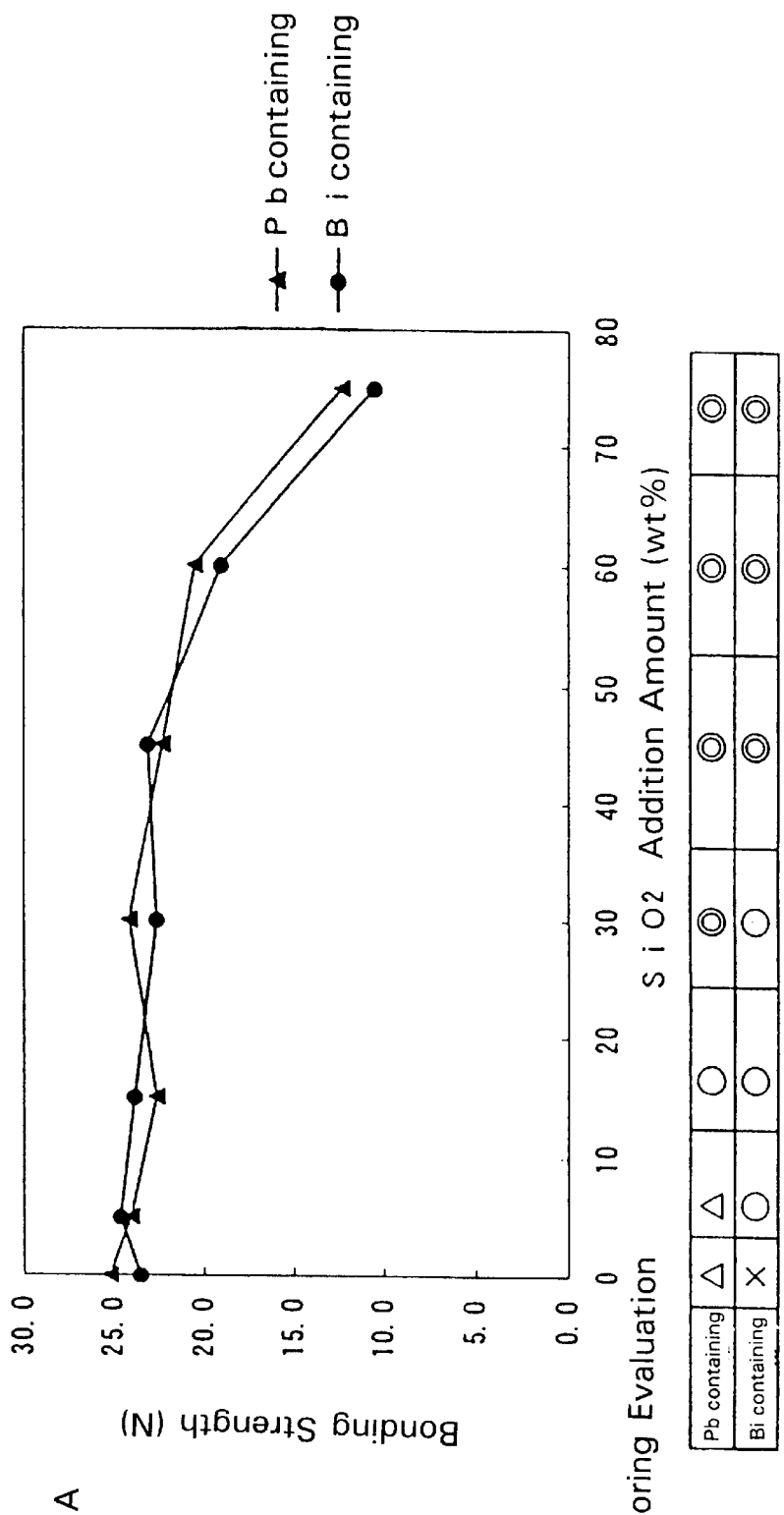
FIG. 2A is a graph showing the relationship between the $SiO_2$ addition amount to the glass frit and the bonding strength.
FIG. 2B is a chart showing the relationship between the $SiO_2$ addition amount and the coloring evaluation.
Figures 3A, 3B:
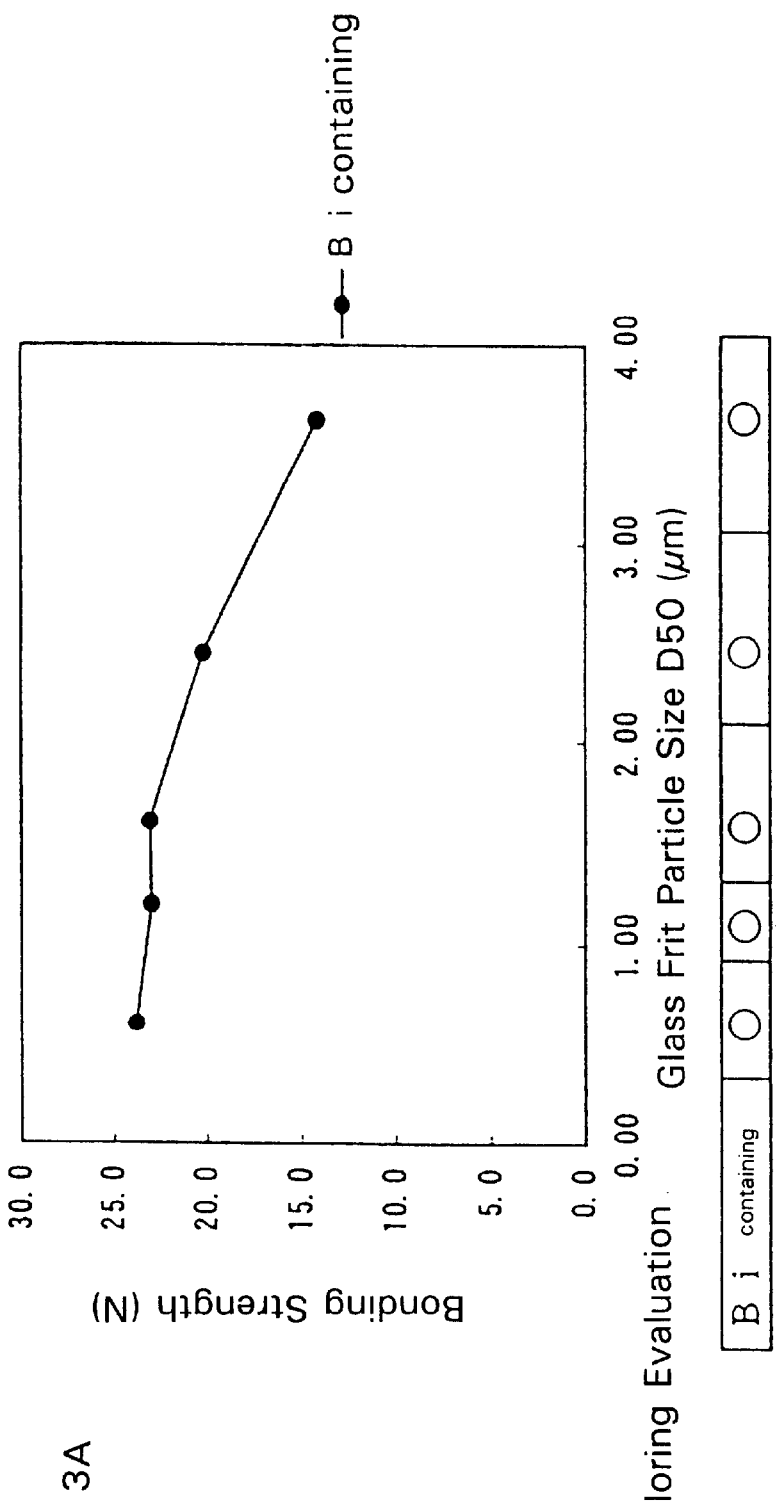
FIG. 3A is a graph showing the relationship between the glass frit particle size and the bonding strength.
FIG. 3B is a chart showing the relationship between the glass frit particle size and the coloring evaluation.
Figures 4A, 4B:
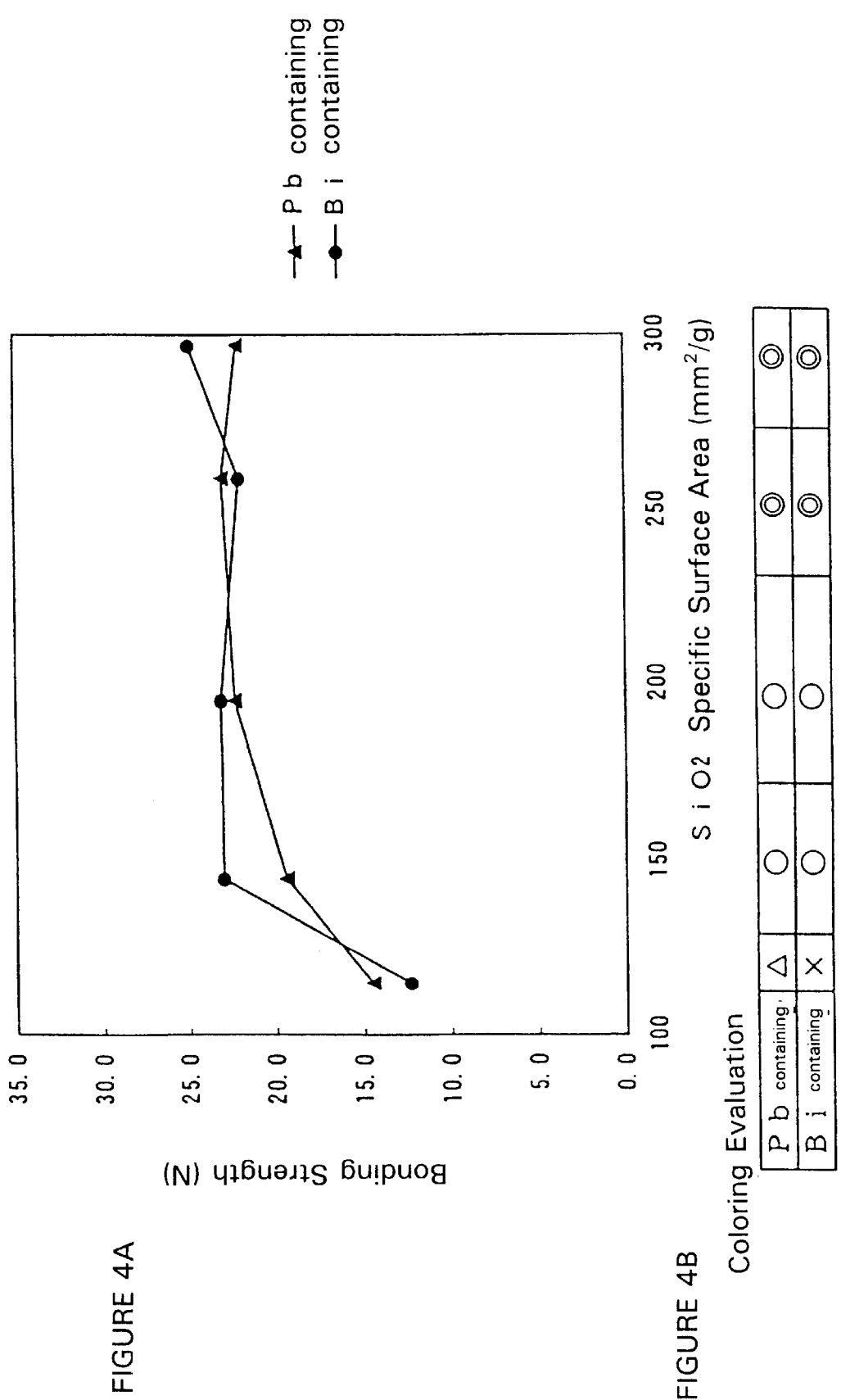
FIG. 4A is a graph showing the relationship between the specific surface area of $SiO_2$ added to the glass frit and the bonding strength.
FIG. 4B is a chart showing the relationship between the $SiO_2$ specific surface area and the coloring evaluation.
Figures 5A, 5B:
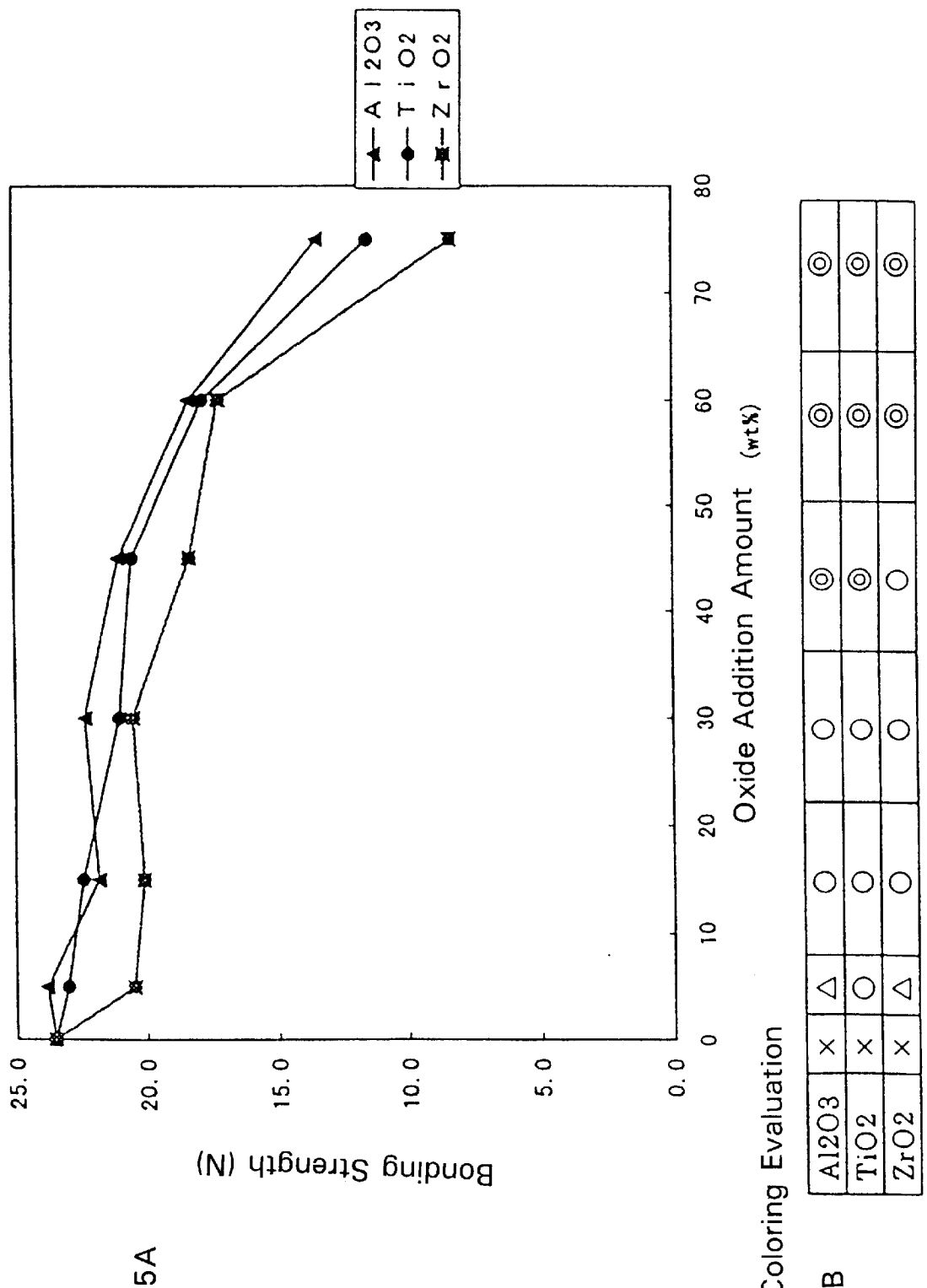
FIG. 5A is a graph showing the relationship between the addition amount of the oxide ($Al_2O_3$, $TiO_2$ and $ZrO_2$) added to the glass frit and the bonding strength.
FIG. 5B is a chart showing the relationship between the oxide ($Al_2O_3$, $TiO_2$ and $ZrO_2$) addition amount and the coloring evaluation.
Figures 6A, 6B:
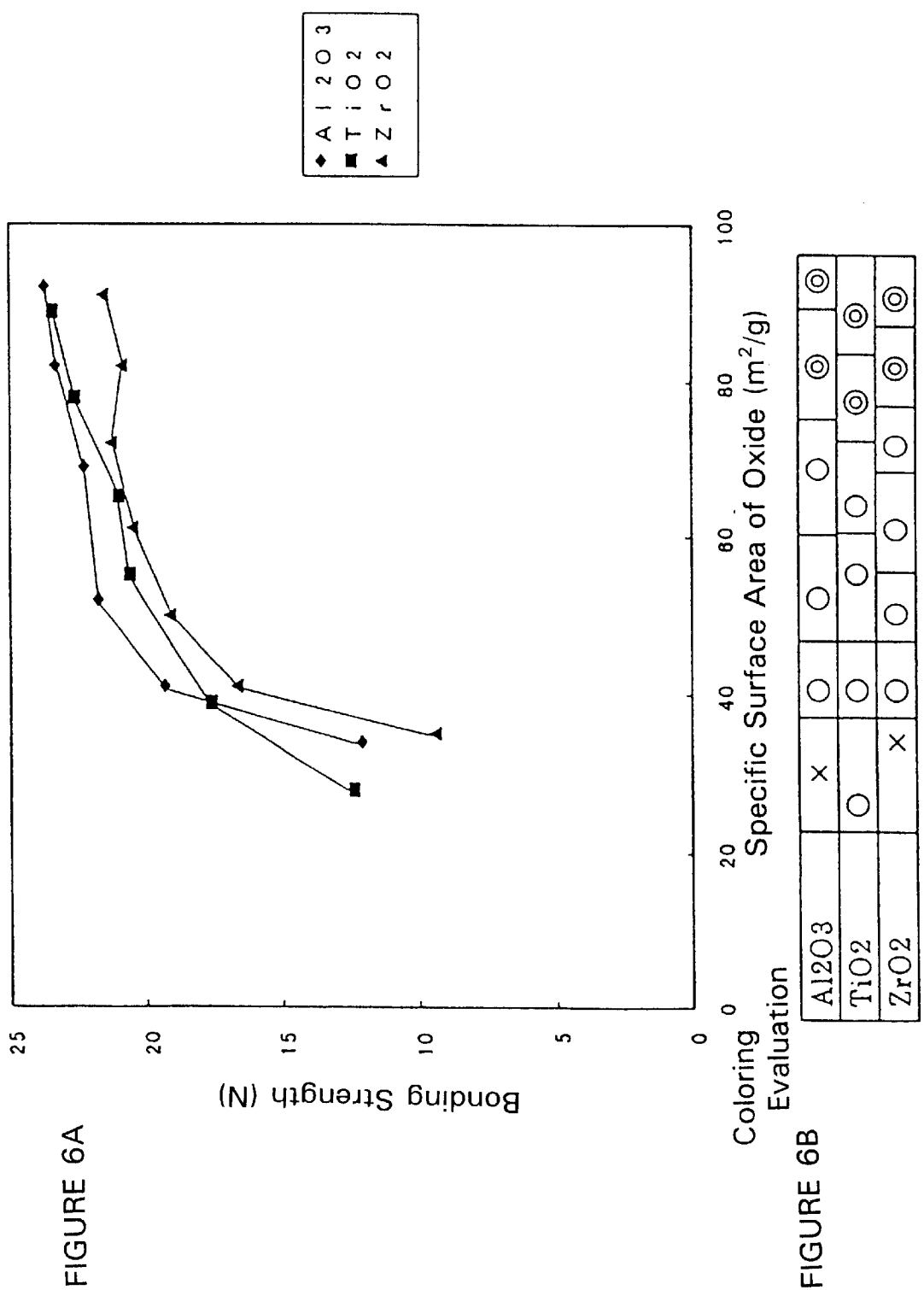
FIG. 6A is a graph showing the relationship between the specific surface area of the oxide ($Al_2O_3$, $TiO_2$ and $ZrO_2$) added to the glass frit and the bonding strength.
FIG. 6B is a chart showing the relationship between the oxide ($Al_2O_3$, $TiO_2$ and $ZrO_2$) specific surface area and the coloring evaluation.

The results are shown in FIG. 1A to FIG. 6A. Measurement of the bonding strength was conducted for 20 samples (n=20). The average value of the measured values is shown in FIGS. 1A, 2A, 3A, 4A, 5A and 6A.

The indication of Pb-containing, Bi-containing, Zn-containing and Ba-containing in each drawing shows the kind of the glass component comprising each glass frit.
Ranking of the Coloring Thickness The coloring thickness of each sample was ranked by the visual observation of the samples prepared by printing the conductive pastes in a 10 mm diameter circle pattern and baking for forming the electrodes, and comparison with standard samples.

Concretely, standard samples (JIS Z 8729) in 3 grades were produced, and numbered as No. 1, No. 2, and No. 3 from the thicker one as shown in Table 1. By visually observing each sample, the coloring thickness was evaluated by putting ⊙ for one obtained a coloring thickness of No. 1 or more, o for one obtained a coloring thickness of No. 2 or more, Δ for one obtained a coloring thickness of No. 3 or more, and x for one obtained a coloring thickness thinner than No. 3.

TABLE 1

|  | No. | *L | *U | *V |
| --- | --- | --- | --- | --- |
| Thicker | 1 | 21.84 | 32.70 | 24.50 |
| ↑ | 2 | 28.67 | 43.67 | 33.48 |
| Thinner | 3 | 38.50 | 50.22 | 45.67 |

*L: psychometric lightness
*U: psychometric chroma coordinate
*V: psychometric chroma coordinate The results thereof (coloring evaluation) are also shown in FIGS. 1B, 2B, 3B, 4B, 5B and 6B. In the column (table) of these drawings, the position of each frame corresponds with the horizontal axis (showing the component addition amount, the specific surface area, or the like) of each line drawing of FIG. 1A to FIG. 6A showing the bonding strength for facilitating understanding. For example, the second column from the left in FIG. 1B corresponds with the 2% by weight glass frit addition amount in FIG. 1A, and the right end column in FIG. 1B corresponds with the 10% by weight glass frit addition amount in FIG. 1A.

The indication of Pb-containing, Bi-containing, Zn-containing and Ba-containing in the column of the coloring evaluation shows the kind of the glass component comprising each glass frit.

Evaluation of the Bonding Strength and the Coloring Thickness

Evaluation of the bonding strength and the coloring thickness will be explained with reference to FIG. 1 to FIG. 6.

FIG. 1 shows the relationship between the glass frit addition amount, the bonding strength and coloring when the addition amount of the glass frits is changed using glass frits not containing $Al_2O_3$, $SiO_2$, $TiO_2$ and $ZrO_2$.

As shown in FIG. 1, with a less than 2.0% by weight glass frit addition amount, the bonding strength of the electrode is insufficient in each glass.

Moreover, with a more than 8.0% by weight glass frit addition amount, it was difficult to solder a lead line for measuring the bonding strength.

Therefore, the glass frit addition amount is preferably in the range from about 2.0 to 8.0% by weight. Since the most stable characteristic can be obtained by having the glass frit addition amount in the range from about 4.0 to 6.0% by weight, this is preferable.

Further, a tendency of obtaining sufficient coloring with a small glass frit addition amount and availability of good coloring with a large glass frit addition amount was found, but the results show that it is difficult to obtain good evaluation in both bonding strength and coloring because $Al_2O_3$, $SiO_2$, $TiO_2$ and $ZrO_2$ are not added.

FIG. 2 shows the relationship between the $SiO_2$ addition amount and the bonding strength and coloring in the case of further adding $SiO_2$ to the glass components comprising the glass frits.

The addition amount of the glass frits with respect to the conductive pastes was fixed to be 4.0% by weight.

As shown in FIG. 2, it is observed that in the case $SiO_2$ is added in an amount up to 60% by weight content ratio in the glass frit, the necessary bonding strength can be obtained, but the bonding strength drastically declined if it exceeds 60% by weight. This is because the electrodes can hardly be baked with a too high $SiO_2$ addition amount.

Moreover, it is observed that the effect is achieved from more than 5% by weight $SiO_2$ addition amount, and thicker coloring can be obtained with a larger $SiO_2$ addition amount.

The bonding strength and the coloring can be obtained most stably in the about 15 to 45% by weight $SiO_2$ addition amount range.

FIG. 3 shows the relationship between the glass frit particle size, and the bonding strength and coloring in the case the particle size of the glass frit is changed using glass frits not containing $Al_2O_3$, $SiO_2$, $TiO_2$ and $ZrO_2$.

The addition amount of the glass frit with respect to the conductive pastes was fixed to be 4.0% by weight.

As shown in FIG. 3, it is observed that the bonding strength tends to decline with a larger glass frit particle size, and with a more than 2.5 $\mu$m particle size, the strength declined to 15N or less.

Concerning coloring, influence of the glass frit particle size was not found.

FIG. 4 shows the relationship between the specific surface area of $SiO_2$ added to the glass components comprising the glass frits, and the bonding strength and coloring.

The addition amount of $SiO_2$ with respect to the glass frits was fixed to be 45% by weight, and the addition amount of the glass frits with respect to the conductive pastes was fixed to be 4.0% by weight.

As shown in FIG. 4, with a larger specific surface area of the added $SiO_2$, the bonding strength is increased and the coloring property is improved.

Moreover, it was observed that the bonding strength drastically declined with a less than 150 $m^2/g$ specific surface area.

Although the $SiO_2$, specific surface area was evaluated only to 300 $m^2/g$, it is considered that a good result can be obtained with a larger specific surface area.

FIG. 5 shows the relationship between the oxide addition amount, and the bonding strength and coloring in the case oxides ($Al_2O_3$, $TiO_2$ and $ZrO_2$) are further added to the glass components comprising the glass frits.

The addition amount of the glass frits with respect to the conductive pastes was fixed to be 4.0% by weight.

As shown in FIG. 5, in the case $Al_2O_3$, $TiO_2$ and $ZrO_2$ are added in an amount up to 60% by weight content ratio in the glass frit, the necessary bonding strength can be obtained, but the bonding strength drastically declined if it exceeds 60% by weight. This is because the electrodes can hardly be baked with a too much oxide ($Al_2O_3$, $TiO_2$ and $ZrO_2$) addition amount.

Moreover, concerning the coloring evaluation, it is observed that the effect is achieved from more than 5% by weight oxide ($Al_2O_3$, $TiO_2$ and $ZrO_2$) addition amount, and thicker coloring can be obtained with a larger oxide addition amount.

The bonding strength and the coloring can be obtained most stably in the about 15 to 45% by weight oxide ($Al_2O_3$, $TiO_2$ and $ZrO_2$) addition amount range.

FIG. 6 shows the relationship between the specific surface area of the oxide ($Al_2O_3$, $TiO_2$ and $ZrO_2$) added to the glass components comprising the glass frit, and the bonding strength and coloring.

The addition amount of the oxide ($Al_2O_3$, $TiO_2$ and $ZrO_2$) with respect to the glass frit was fixed to be 45% by weight, and the addition amount of the glass frit with respect to the conductive pastes was fixed to be 4.0% by weight.

As shown in FIG. 6, with a larger specific surface area of the added oxide ($Al_2O_3$, $TiO_2$ and $ZrO_2$), the bonding strength is increased and the coloring property is improved.

Moreover, the bonding strength declined as well as coloring tends to be thinner with less than 40 $m^2/g$ specific surface area.

Although the case of using silver powders as the conductive component has been explained in the above-mentioned embodiments, metal powders comprising Ag and at least one of Cu, Pd and Pt can also be used as the conductive component. Further, other substances can be contained as the conductive component.

Moreover, although the case including nickel powders and copper oxide powders for adjusting the resistance value has been explained in the above-mentioned embodiments, the nickel powders and the copper oxide powders need not be added in some cases.

Furthermore, by forming a circuit on a glass substrate using the conductive paste according to the present invention, a defogging glass for an automobile having large electrode bonding strength and a sufficient coloring thickness can be obtained. Since the production method and the concrete configuration of a defogging glass for an automobile are not different from conventional ones, explanation thereof is omitted.

While the invention has been particularly shown and described with reference to preferred embodiments thereof, it will be understood by those skilled in the art that the forgoing and other changes in form and details may be made therein without departing from the spirit of the invention.

What is claimed is:

1. A conductive paste comprising a conductive component, a glass frit and a vehicle, and also comprising at least one of nickel and copper oxide, wherein:

the glass frit comprises glass and separate from the glass at least one member selected from the group consisting of alumina, silica, titania and zirconia, and the paste is chromium oxide free.

2. The conductive paste according to claim 1, wherein the conductive component comprises Ag.

3. The conductive paste according to claim 2, wherein the alumina, titania and zirconia have a specific surface area of about 40 to 90 $m^2/g$, the silica has a specific surface area of about 150 to 300 $m^2/g$ and the content of alumina, silica, titania and zirconia is about 5 to 60% by weight of the glass frit.

4. The conductive paste according claim 3, wherein the glass frit amount is about 2.0 to 8.0% by weight.

5. The conductive paste according to claim 4, also comprising at least one of nickel and copper oxide.

6. The conductive paste according to claim 5, wherein the glass is a Pb, Bi, Zn or Ba-containing glass whose average particle size in the range from about 0.5 to 2.5 $\mu$m.

7. The conductive paste according to claim 6, wherein the amount of glass frit is about 4 to 6% by weight.

8. The conductive paste according to claim 2, wherein the conductive component comprises Ag and at least one member selected from the group consisting of Cu, Pd and Pt.

9. The conductive paste according to claim 8, wherein the alumina, titania and zirconia have a specific surface area of about 40 to 90 $m^2/g$, the silica has a specific surface area of about 150 to 300 $m^2/g$ and the content of alumina, silica, titania and zirconia is about 5 to 60% by weight of the glass frit.

10. The conductive paste according claim 9, wherein the glass frit amount is about 2.0 to 8.0% by weight.

11. The conductive paste according to claim 10, wherein the glass is a Pb, Bi, Zn or Ba-containing glass whose average particle size in the range from about 0.5 to 2.5 $\mu$m.

12. The conductive paste according claim 11, wherein the amount of glass frit is about 4 to 6% by weight.

13. The conductive paste according to claim 1, wherein the glass is a Pb, Bi, Zn or Ba-containing glass whose average particle size in the range from about 0.5 to 2.5 $\mu$m.

14. A conductive paste comprising a conductive component, a glass frit and a vehicle, wherein:

the glass frit comprises glass and separate from the glass at least one member selected from the group consisting of alumina, silica, titania and zirconia, the paste is chromium oxide free, and the alumina, titania and zirconia have a specific surface area of about 40 to 90 $m^2/g$, the silica has a specific surface area of about 150 to 300 $m^2/g$ and the content the at least one member selected from the group consisting of alumina, silica, titania and zirconia is about 5 to 60% by weight of the glass frit.

15. The conductive paste according claim 1, wherein the amount of glass frit is about 2.0 to 8.0% by weight.

16. A glass substrate having a circuit thereon, wherein said circuit is a baked conductive paste of claim 1.

17. A glass substrate having a circuit thereon, wherein said circuit is a baked conductive paste of claim 3.

18. A glass substrate having a circuit thereon, wherein said circuit is a baked conductive paste of claim 4.

19. The conductive paste according to claim 1, wherein the glass frit is a glass cullet and said member is a powder.

* * * * *